(12) United States Patent
McCreery

(10) Patent No.: US 10,697,279 B2
(45) Date of Patent: Jun. 30, 2020

(54) PORTABLE PUMP SYSTEM FOR USE OVER A WELLBORE

(71) Applicant: Patrick Kelley McCreery, Gillette, WY (US)

(72) Inventor: Patrick Kelley McCreery, Gillette, WY (US)

( * ) Notice: Subject to any disclaimer, the term of this patent is extended or adjusted under 35 U.S.C. 154(b) by 52 days.

(21) Appl. No.: 16/173,317

(22) Filed: Oct. 29, 2018

(65) Prior Publication Data

US 2020/0131893 A1  Apr. 30, 2020

(51) Int. Cl.
| | | |
|---|---|---|
| *E21B 43/12* | (2006.01) | |
| *E03B 5/04* | (2006.01) | |
| *F04B 17/00* | (2006.01) | |
| *B60S 9/04* | (2006.01) | |
| *B65H 75/42* | (2006.01) | |
| *F16H 7/06* | (2006.01) | |
| *A01K 7/00* | (2006.01) | |

(52) U.S. Cl.
CPC .............. *E21B 43/128* (2013.01); *B60S 9/04* (2013.01); *B65H 75/425* (2013.01); *E03B 5/04* (2013.01); *F04B 17/006* (2013.01); *F16H 7/06* (2013.01); *A01K 7/00* (2013.01); *B65H 2701/33* (2013.01); *Y10T 137/6899* (2015.04); *Y10T 137/6932* (2015.04); *Y10T 137/6936* (2015.04)

(58) Field of Classification Search
CPC .............. B65H 75/425; B65H 75/4442; Y10T 137/6899; Y10T 137/6932; Y10T 137/6936; F04B 17/006; E21B 43/128

USPC .......................... 417/423.3; 242/390.8, 390.9
See application file for complete search history.

(56) References Cited

U.S. PATENT DOCUMENTS

| | | | | |
|---|---|---|---|---|
| 2,573,868 A | * | 11/1951 | Newell .............. | B65H 75/4486 137/355.21 |
| 3,995,355 A | * | 12/1976 | Sneed ..................... | B60P 3/035 29/890.144 |
| 4,012,002 A | * | 3/1977 | McDonald ......... | B65H 75/4486 242/390.8 |
| 4,220,981 A | * | 9/1980 | Koether .................... | B60P 3/18 362/238 |
| 4,802,829 A | * | 2/1989 | Miller ................... | F04B 17/006 417/118 |
| 4,856,838 A | * | 8/1989 | Reshke ..................... | B60P 3/00 296/14 |
| 4,993,449 A | * | 2/1991 | Stutzman ............. | B65H 75/425 137/355.2 |
| 5,246,350 A | * | 9/1993 | Lackstrom .............. | E21B 36/00 417/379 |

(Continued)

*Primary Examiner* — Kevin F Murphy
(74) *Attorney, Agent, or Firm* — Antoinette M. Tease

(57) ABSTRACT

A portable pump system for use over a wellbore, the system having a utility trailer with a trailer bed and two wheels, a reel around which is wound a length of flexible pipe, an array of solar panels, a submersible pump, front outrigggers extending laterally from opposite sides of a front end of the trailer bed, and rear outriggers extending laterally from opposite sides of a rear end of the trailer bed. The reel is situated at a rear end of the trailer bed. The array of solar panels is situated in the front half of the trailer bed. The submersible pump is attached to a distal end of the flexible pipe. The array of solar panels is configured to supply power to the submersible pump. The reel is mechanically coupled to a sprocket system situated on top of the trailer bed and adjacent to the reel.

6 Claims, 20 Drawing Sheets

(56) References Cited

U.S. PATENT DOCUMENTS

| | | | |
|---|---|---|---|
| 5,336,061 A * | 8/1994 | Armstrong | F04B 9/06 417/411 |
| 6,922,348 B2 * | 7/2005 | Nakajima | F04B 17/006 318/801 |
| 8,261,625 B2 * | 9/2012 | Picerno | F16H 31/005 137/355.21 |
| 8,467,741 B2 * | 6/2013 | Newman | H01Q 1/3216 455/561 |
| 9,945,366 B1 | 4/2018 | McLaughlin | |
| 2008/0023579 A1 * | 1/2008 | Leonard | B65H 75/22 242/390.8 |
| 2009/0218106 A1 * | 9/2009 | Stukey | E21B 19/22 166/384 |
| 2013/0098816 A1 | 4/2013 | Elfstrom | |
| 2014/0356198 A1 | 12/2014 | Rulli | |
| 2016/0141912 A1 | 5/2016 | Lawrence | |
| 2017/0138021 A1 | 5/2017 | Stojanovic | |
| 2018/0045188 A1 | 2/2018 | Spybey et al. | |

\* cited by examiner

PORTABLE PUMP SYSTEM FOR USE OVER A WELLBORE

BACKGROUND OF THE INVENTION

1. Field of the Invention

The present invention relates generally to the field of portable pump systems, and more specifically, to a portable pump system installed on a trailer bed for use in pumping water from a wellbore.

2. Description of the Related Art

Cattle require water, and the cost of installing water wells is expensive, for a number of reasons. First, the pumps are installed in the wells and left there, which means that one pump can only service a single well. Second, power lines must be built to each well; on a large tract of land, these power lines may be miles long. Third, in the event of any maintenance or repair issues, conventional pump systems typically require a pulling unit truck with a three-man crew to pull the pipe out of the well.

Solar-powered pump systems do exist, but they tend to be cemented to the ground (which means they cannot be moved from one well to another) or situated on a stand that is stationary and non-adjustable. Reel systems have been used to pull pump cable from oil wells, but they are usually mounted on at least a two-ton truck and often a tandem semi-trailer truck, which is a huge expense. The present invention resolves all of these issues by providing a portable, cost-effective pump system that is easy to use and can be operated by a single person in the field.

U.S. Pat. No. 9,945,366 (McLaughlin, 2018) provides a wheeled pumping station in which a computer operates a pump and drive motor, wherein the drive motor is mechanically connected to wheels that support a chassis. A housing situated on the chassis contains the drive motor, the computer, a powering member, and the pump. The pump includes an intake hose that extends downward from the housing and is adapted to interface with water resting on a ground surface. The pump draws water into the intake hose, through the pump, and out an outflow conduit. The powering member is wired to the computer, a GPS unit, a transceiver, and a solar panel on top of the housing. The pumping can be operated remotely and moved from one location to another via the computer.

U.S. Patent Application Pub. No. 20130098816 (Elfstrom) describes a mobile water purification station that is powered by an integrated solar array and wind generator Or by utilizing gravity feed from a water source located above the geographic location of the unit. The station includes a submersible pump and connecting hose, as well as a water filtration and purification assembly comprising two parallel water treatment Systems operable separately or concurrently to product filtered utility water and/or purified potable water. Each of the parallel water treatment systems comprises a sediment filter, a heavy metals filter, an activated carbon filter, a pre-filter and an ultra-filter plumbingly connected in series for water flow therethrough.

U.S. Patent Application Pub. No. 20140356198 (Rulli) discloses a pumping system for pumping water from streams, ponds or shallow wells. The pumping system has a rotating reel assembly, a submersible pump assembly that is powered by a solar panel, and a portable cart. The frame of the portable cart supports the reel assembly and solar panel, and it also detachably receives and retains the submersible pump assembly. The system further comprises a wheel assembly for rolling the pump system to a remote location to pump water in areas with little or no access to grid electricity or liquid fuel.

U.S. Patent Application Pub. No. 20160141912 (Lawrence) conceptualizes a water supply system that stores energy generated by solar cells. A solar cell panel generates direct current (DC) by collecting concentrated sunlight. A converter is configured to amplify and output the DC from the solar cell panel, and an inverter converts the DC outputted from the converter to an alternating current (AC). In a preferred embodiment, the controller is configured to supply the DC that has been stored in saving unit to the inverter so as to convert the DC stored into an AC and then to supply the AC to the pump when an amount of the DC generated by the solar panel drops below a preset value.

U.S. Patent Application Pub. No. 20170138021 (Stojanovic) provides an adjustable system for pumping water with a self-priming pump. The system includes a check valve, flexible plastic hose, water container, pump, power supply and drain hose. The power source is alternating or direct or solar panel. The flexible hose is first filled with water, and then the entire system is lowered into the well. One end of the flexible hose is connected to the check valve, and the other end is connected to the pump.

U.S. Patent Application Pub. No. 20180045188 (Spybey et at) discloses a modular pump system with multiple discrete pump assemblies in serial and/or parallel configurations. The assemblies may be combined by hand quickly and without tools for use in remote areas. The pump housing has an inner chamber that accommodates a pump, an inlet for drawing fluid into the pump, an outlet for expelling fluid from the pump, and an elongate outer casing surrounding the inner chamber and comprising first and second quick connects. The pump housing is configured to be coupled to a corresponding pump housing in either serial or parallel configuration using the quick connects.

BRIEF SUMMARY OF THE INVENTION

The present invention is a portable pump system for use over a wellbore comprising: a utility trailer having a trailer bed and two wheels; a reel around which is wound a length of flexible pipe; an array of solar panels; a submersible pump; a pair of front outrigggers extending laterally from opposite sides of a front end of the trailer bed; and a pair of rear outriggers extending laterally from opposite sides of a rear end of the trailer bed; wherein the reel is situated at a rear end of the trailer bed; wherein the trailer bed has a front half and a rear half, and the array of solar panels is situated in the front half of the trailer bed; wherein the submersible pump is attached to a distal end of the flexible pipe; wherein the array of solar panels is configured to supply power to the submersible pump; and wherein the reel is mechanically coupled to a sprocket system situated on top of the trailer bed and adjacent to the reel.

In a preferred embodiment, the sprocket system comprises a first sprocket that is mechanically coupled to a first chain; the first chain is mechanically coupled to a second sprocket; the first chain is configured to cause the second sprockets to rotate as the first sprocket rotates; the second sprocket shares a common axle with a third sprocket so that as the second sprocket rotates, the third sprocket also rotates; the third sprocket and a fourth sprocket are both mechanically coupled to a second chain; the second chain is configured to cause the fourth sprocket to rotate as the third sprocket rotates; the fourth sprocket shares a common axle with a fifth sprocket so that as the fourth sprocket rotates, the fifth sprocket also rotates; the fifth sprocket and a sixth sprocket are both mechanically coupled to a third chain; the third chain is configured to cause the sixth sprocket to rotate as the fifth sprocket rotates; and the sixth sprocket is mechanically coupled to a central axle of the reel so that the reel rotates when the sixth sprocket rotates. In a preferred embodiment, the second sprocket, the third sprocket, and the fifth sprocket are all the same size and are all smaller than the first sprocket, the fourth sprocket and the sixth sprocket; the fourth sprocket is larger than the first sprocket; and the sixth sprocket is larger than the fourth sprocket.

In a preferred embodiment, the array of solar panels is configured to rotate horizontally and to tilt vertically. Preferably, the invention further comprises a hand crank and an electric motor; wherein the hand crank is configured so as to be removably and mechanically coupled to both the second sprocket and the fourth sprocket; and wherein the electric motor is configured to drive the first sprocket.

In a preferred embodiment, the front outriggers are mounted on the underside of the front end of the trailer bed; the rear outriggers are mounted on the topside of the rear end of the trailer bed; and the front outriggers lie on a first horizontal plane, the rear outriggers lie on a second horizontal plane, and the first horizontal plane is lower than the second horizontal plane. Preferably, the front outriggers are configured to be removably stored within a first elongated housing located on the underside of the front end of the trailer bed; and the rear outriggers are configured to be removably stored within a second elongated housing located on the topside of the rear end of the trailer bed.

In a preferred embodiment, the reel comprises a right flange, a left flange, and a central drum around which the pipe is wound; and the reel further comprises a lip that extends circumferentially around a periphery of the right flange. Preferably, the invention further comprises a diagonal bracket situated behind the second chain and above the first chain, the diagonal bracket being configured to accept a key; and the lip comprises a plurality of recesses configured to receive the key when it is inserted into the diagonal bracket.

In a preferred embodiment, the invention further comprises hand brake and a brake pad; and the brake pad is positioned to contact the lip on the right flange of the reel when downward pressure is placed on the hand brake via a pivot point situated on top of the trailer bed and underneath the reel. The array of solar panels is preferably situated on a frame; the frame has a width; the trailer bed has a width; and the width of the frame approximately equal to the width of the trailer bed.

REFERENCE NUMBERS

Figure 1:
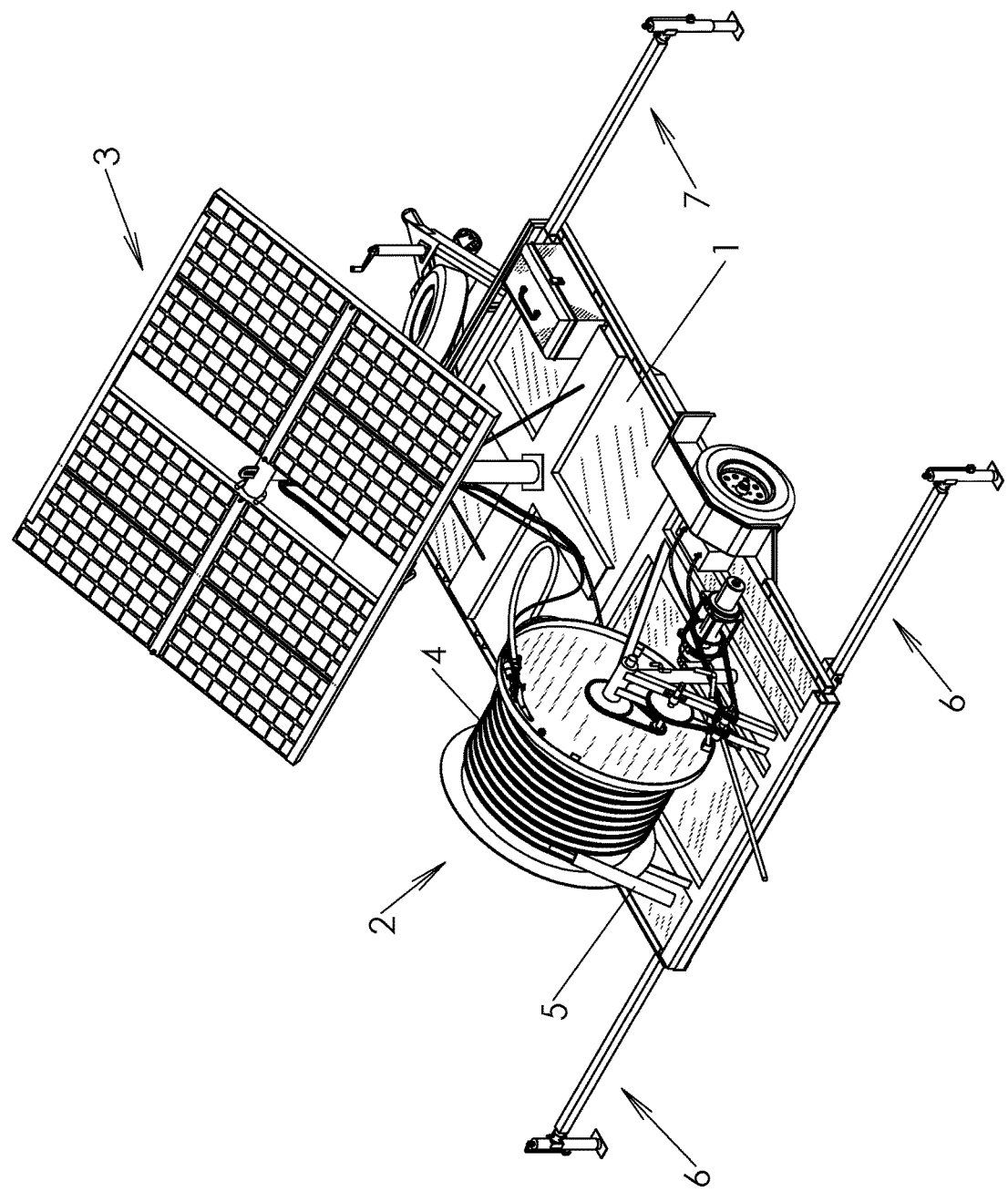
FIG. 1 is a front perspective view of the present invention.

1 Trailer
2 Reel
2a Lip (brake band)
2b Right flange (on reel)
2c Left flange (on reel)
2d Drum,
3 Solar panels
4 Pipe
5 Pump
6 Front outrigger
6a Elongated tube (of front outrigger)
6b Elongated housing (of front outrigger)
7 Rear outrigger
7a Elongated tube (of rear outrigger)
7b Elongated housing (of rear outrigger)
7c Jack
8 Control box
8a Box stop
9a Hand brake
9b Brake pad
10a Electrical conduit (to pump)
10b Electrical conduit (to low water shutoff)
11 Frame
12 Vertical post
13 Bracket (solar panel framework)
15 First sprocket
16 First chain
17 Second sprocket
18 Third sprocket
19 Fourth sprocket
20 Second chain
21 Fifth sprocket
22 Sixth sprocket
23 Third chain
24 Recess
25 Diagonal bracket
26 Key
27 Pivot point
28 Height adjustment member
28a Block
28b Extension
28c Hole (in extension)
29 Hexagonal nut
30 Hand crank 31 Electric motor (winch)
32 Battery
33 Set screw (threaded bolt)
34a First flange (on vertical post)
34b Second flange (on vertical post)
35 Clamp (first embodiment)
36 Clamp (second embodiment)
37 Base plate
38 Bracket (sprocket system)
39 Horizontal member
40 Tube
41 Set screw (threaded bolt)
42 Lifting eye

DETAILED DESCRIPTION OF INVENTION

FIG. 1 is a front perspective view of the present invention. As shown in this figure, the invention comprises a utility (flatbed) trailer 1 on which are situated a reel 2 and an array of solar panels 3. The array of solar panels 3 is configured so that it can swivel (or rotate) horizontally and tilt vertically. This dual adjustability allows the solar panels 3 to be positioned optimally relative to the sun regardless of time of day or geographic location. The solar panel array 3 is a plurality of solar panels in a framework. The present invention is not limited to any particular number of solar panels or any particular framework construction.

Figure 15:
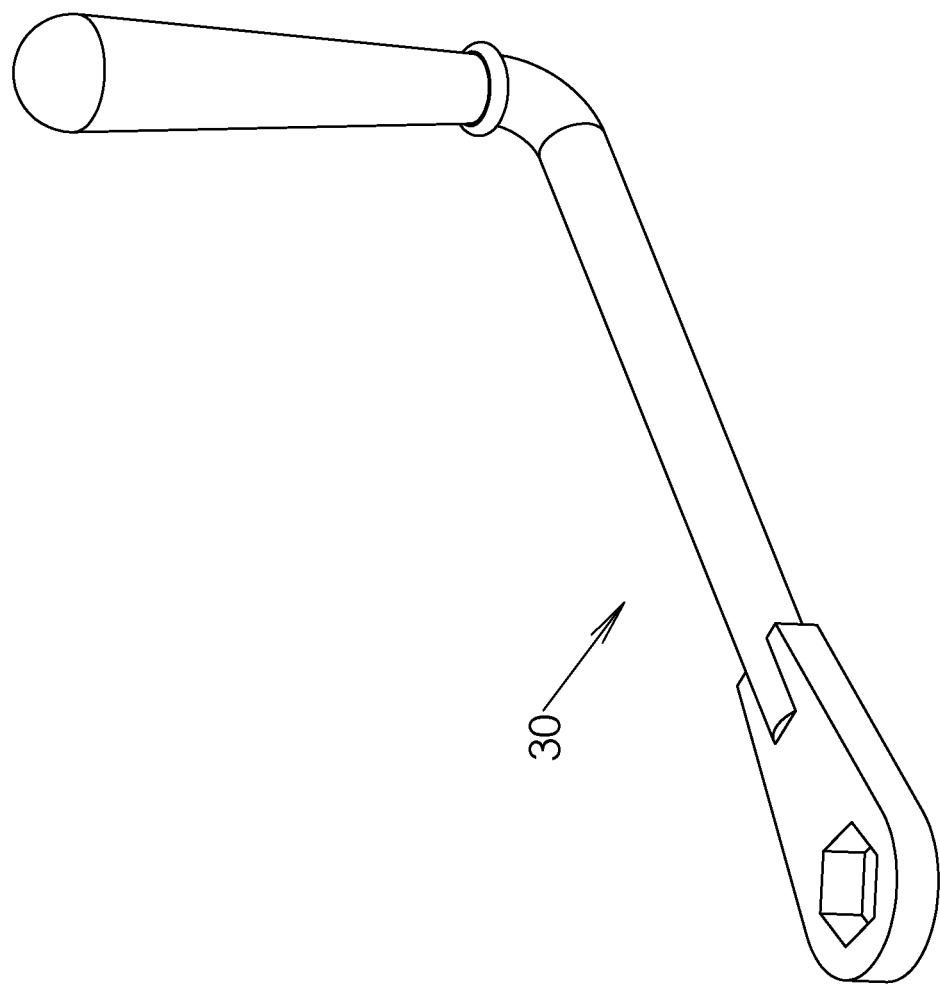
FIG. 15 is a perspective view of the hand crank of the present invention.

A polyethylene flexible coil pipe 4 (with a pressure rating of 200 pounds per square inch) is wound around the reel 2, and a submersible pump 5 is connected to the distal end of the pipe 4. In a preferred embodiment, the reel 2 is large enough to hold 400 feet of one-inch poly pipe. Electrical conduits 10a, 10b are attached to the pipe and runs from the control box 8 to the pump 5. In lieu of the solar panels, a small generator (not shown) could be mounted on the trailer bed 1 to pump water at night or on cloudy days. The reel itself may be operated by a hand crank 30 (see FIG. 15) or an electric motor (winch) 31 that is powered by a battery 32. The hand crank 30 may be attached to one of two hexagonal nuts 29; the first hexagonal nut is welded to the second sprocket 17, and the second hexagonal nut is welded to the fourth sprocket 19. If the hand crank is used on the second sprocket, then it takes eight turns of the hand crank to turn the reel one revolution; if the hand crank is used on the fourth sprocket, then it takes two and a half turns of the hand crank to turn the reel one revolution. (The latter might be preferred if the pipe is not on the reel, and the goal is to spin the reel fairly quickly.) The electric motor 31 drives the first sprocket 15. The sprocket system is described more fully below in connection with FIG. 7.

A pair of front outriggers 6 extend laterally from the underside of the front end of the trailer bed, and a pair of rear outriggers 7 extend laterally from the topside of the rear end of the trailer bed. The purpose of the outriggers is to stabilize the trailer 1 against wind and on uneven terrain.

Figure 2:
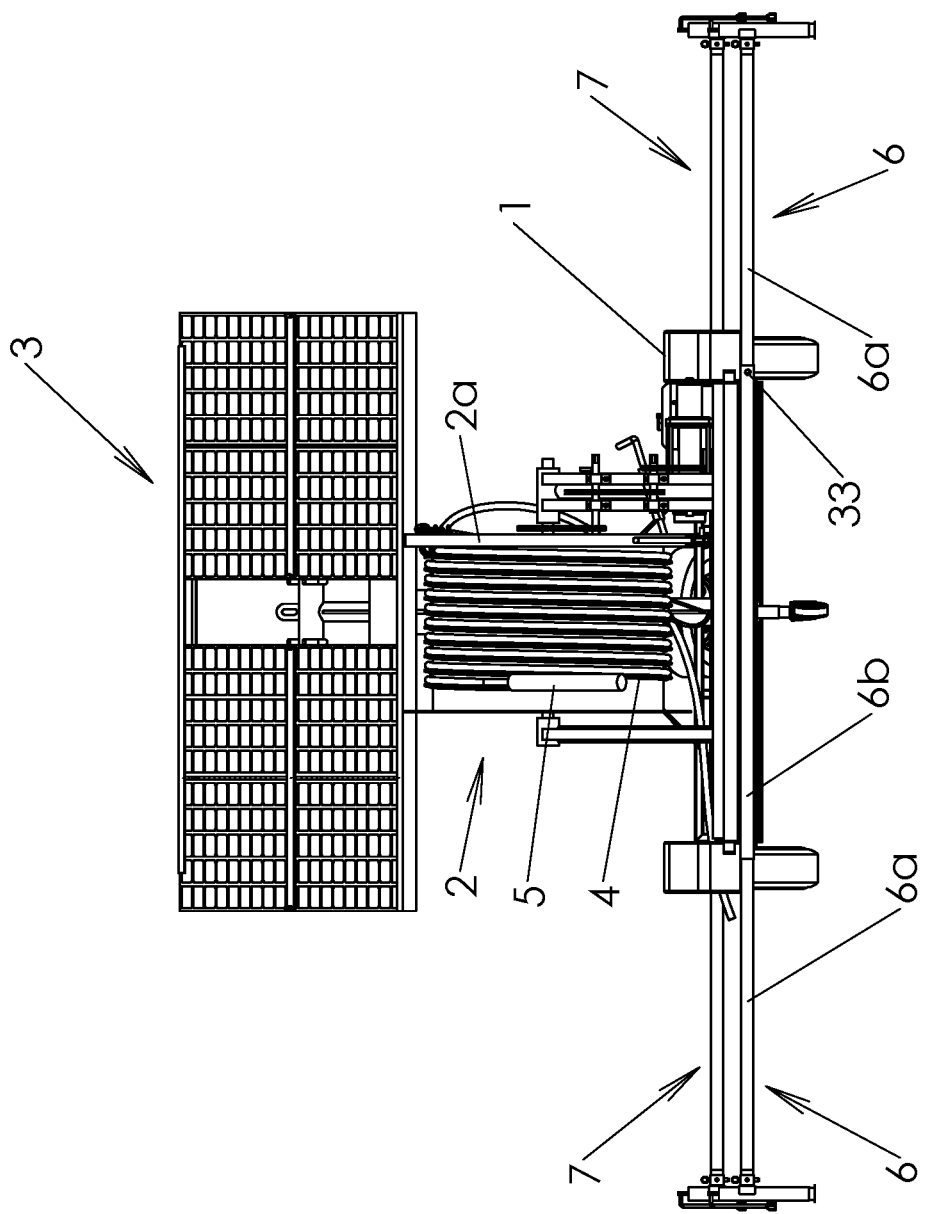
FIG. 2 is a front view of the present invention.
Figure 7:
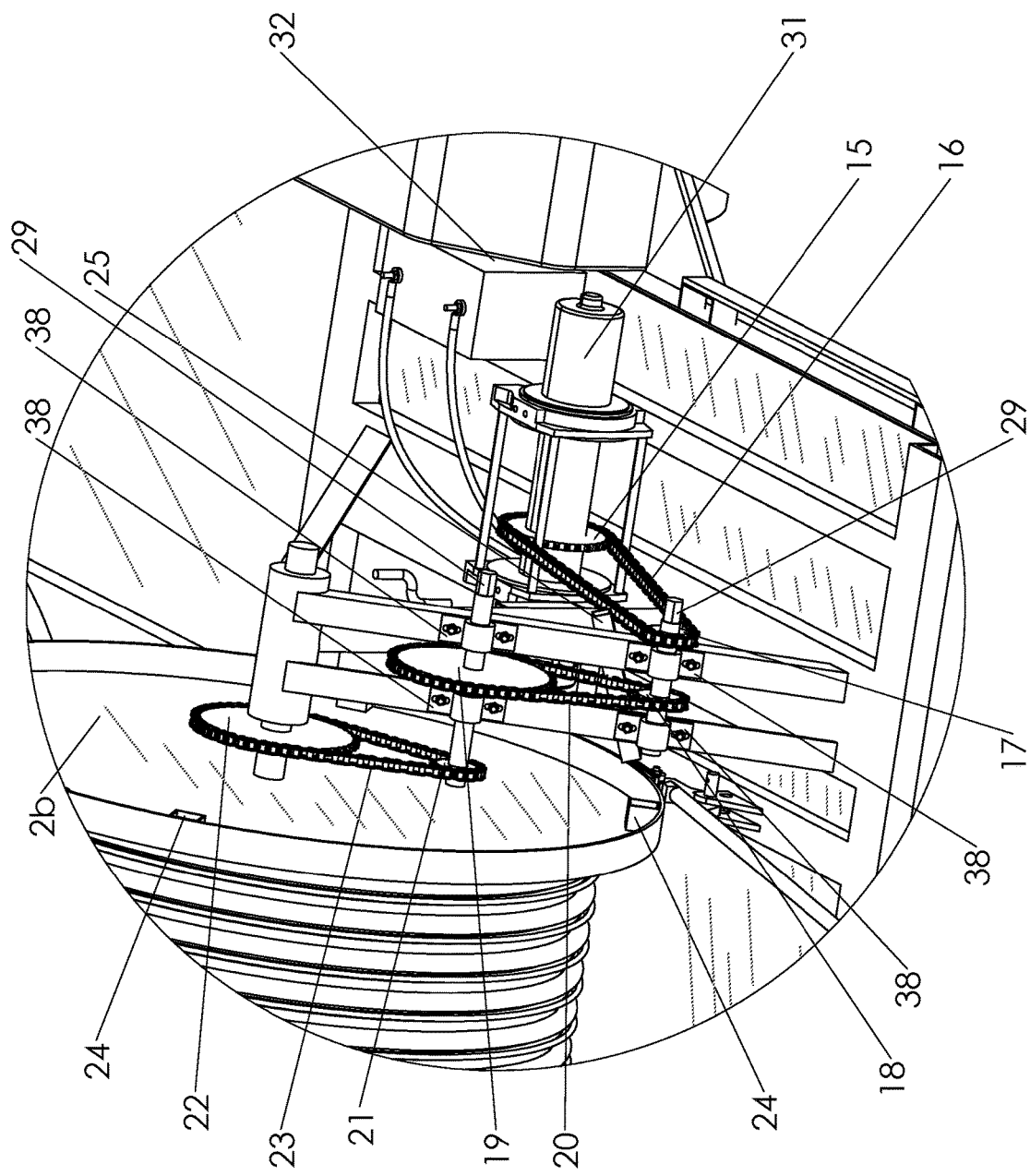
FIG. 7 is a detail view of the sprocket system of the present invention.

FIG. 2 is a front view of the present invention. As shown in this figure, because the rear outriggers 7 are mounted on top of the trailer bed and the front outriggers 6 are mounted underneath the trailer bed, the rear outriggers 7 lie on a higher horizontal plane than the front outriggers 6. In a preferred embodiment, the right-hand side of the reel 2 comprises a circumferential lip 2a, the purpose of which will become apparent below. The sprocket system shown in detail in FIG. 7 is situated to the right of the reel. Note that the sprocket system must be spaced a sufficient distance from the right flange 2b to allow the clamp 35 on the right flange 2b to rotate without hitting anything.

Figure 3:
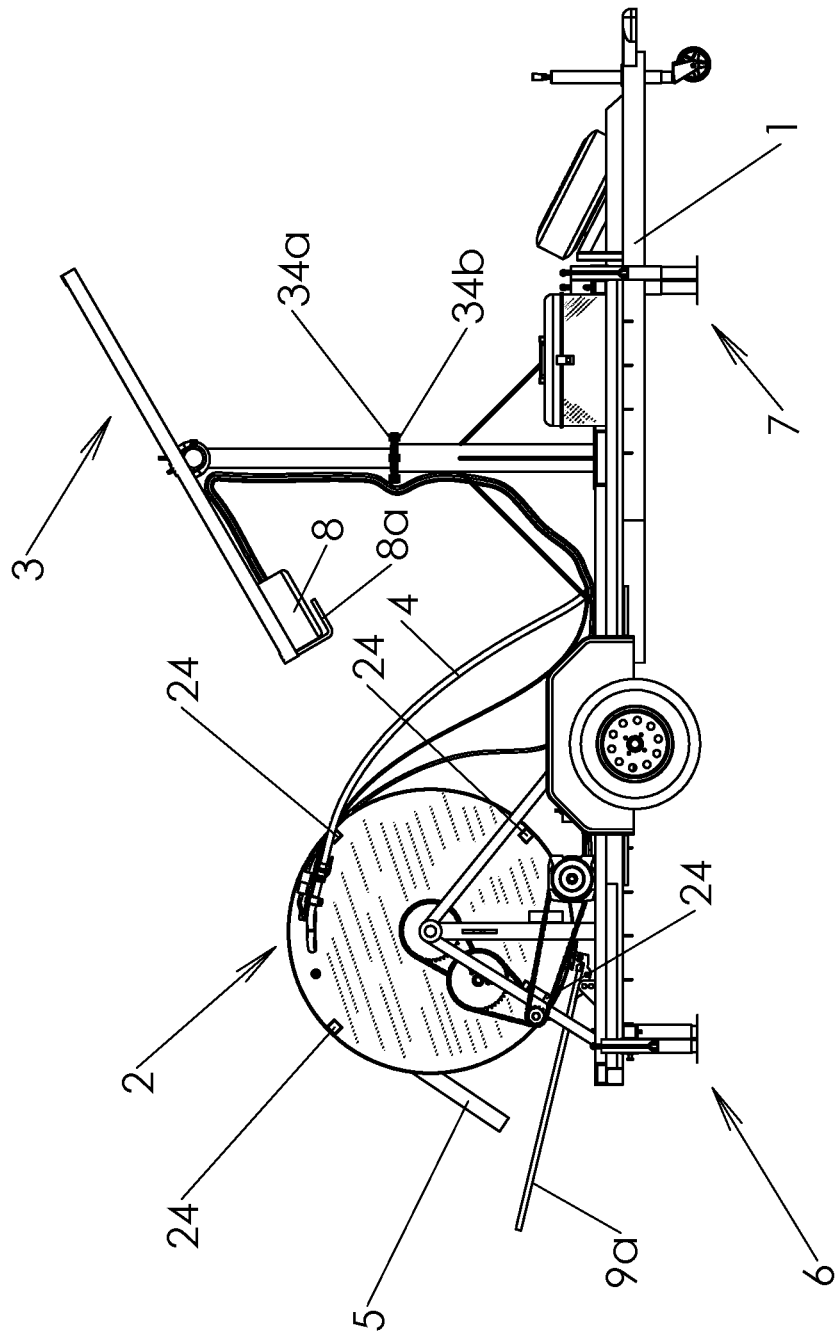
FIG. 3 is a first side view of the present invention.
Figure 18:
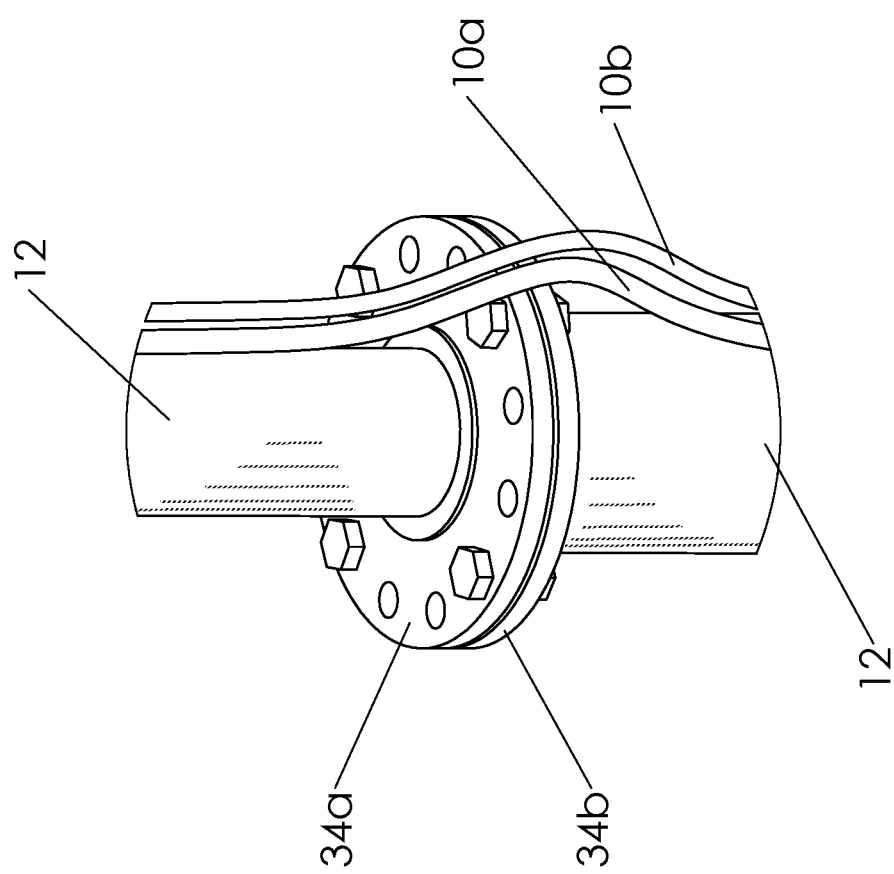
FIG. 18 is a detail view of the flanges in the center of the vertical post.

FIG. 3 is a first side view of the present invention. This figure shows the control box 8 situated underneath the array of solar panels 3. This control box 8 houses the solar charge controller and is preferably protected by a box stop 8a. This figure also shows the hand brake 9a, which is shown in detail in FIG. 8. To rotate (or swivel) the solar panel array 3 horizontally, two flanges 34a, 34b in the approximate center of the vertical post 12 that are normally secured together with bolts are decoupled (the bolts are removed). The top part of the vertical post can then be rotated relative to the bottom part of the post, and the two flanges 34a, 34b are then re-secured (or bolted) together (see FIG. 18). The top part of the post 12 preferably fits into the bottom part of the post 12 (all the way to the base plate 37) to provide additional stability. Note that with the solar panel array 3 tilted at a 45-degree angle, the lowest end of the solar panel framework is still higher than the reel. This relative configuration is intentional—the solar panels must be high enough so that cattle will not interfere with them.

Figure 4:
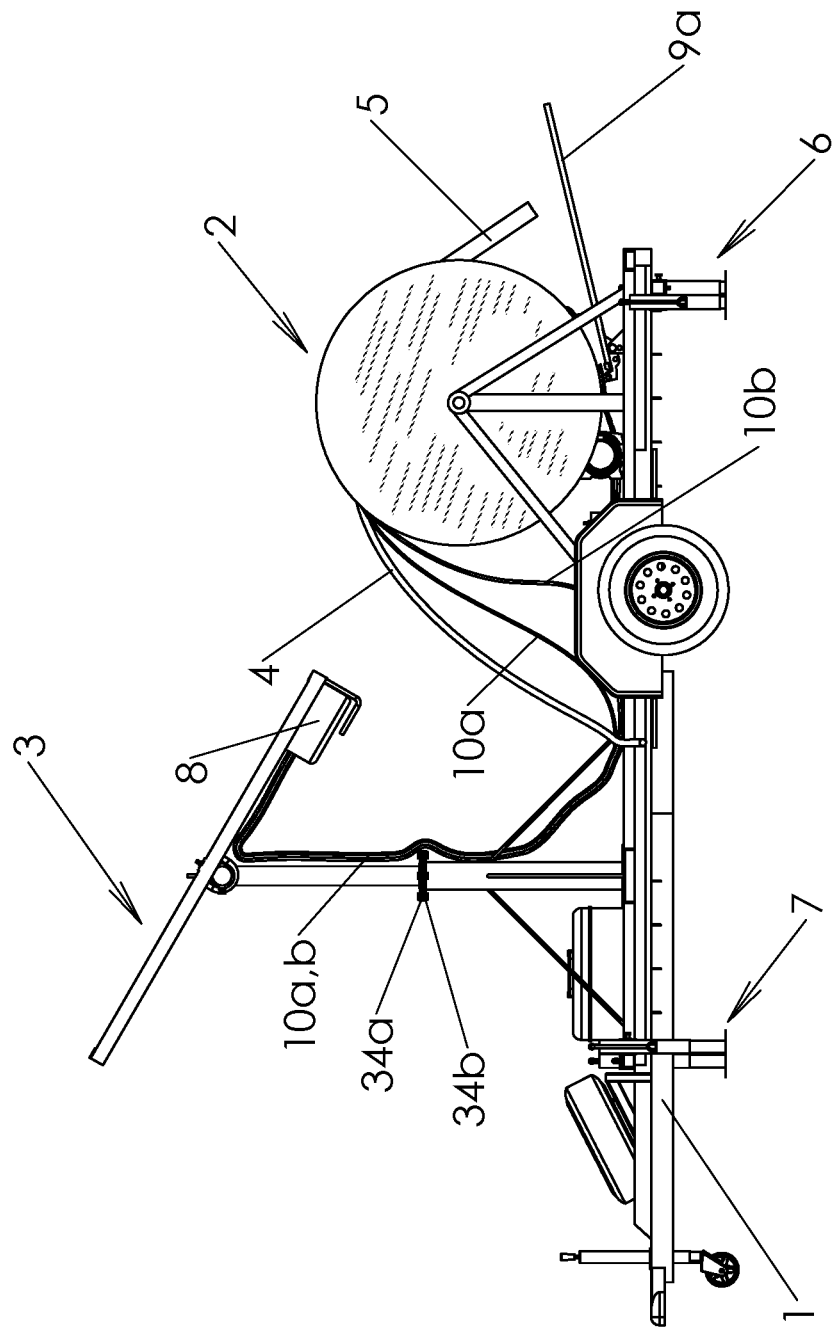
FIG. 4 is a second side view of the present invention.

FIG. 4 is a second side view of the present invention. This figure shows that part of the pipe 4 through which water is drawn up from the wellbore by the pump 5 and expelled into a water tank or other water container or reservoir. It also shows the electrical conduits 10a, 10b that run from the control box 8 to the reel 2. One electrical conduit 10a supplies power to the pump 5, and the other electrical conduit 10b operates the low water shutoff valve. Note that both of these electrical conduits 10a, 10b are secured to the pipe 4 along the entire length of the pipe and connected to the pump 5.

Figure 5:
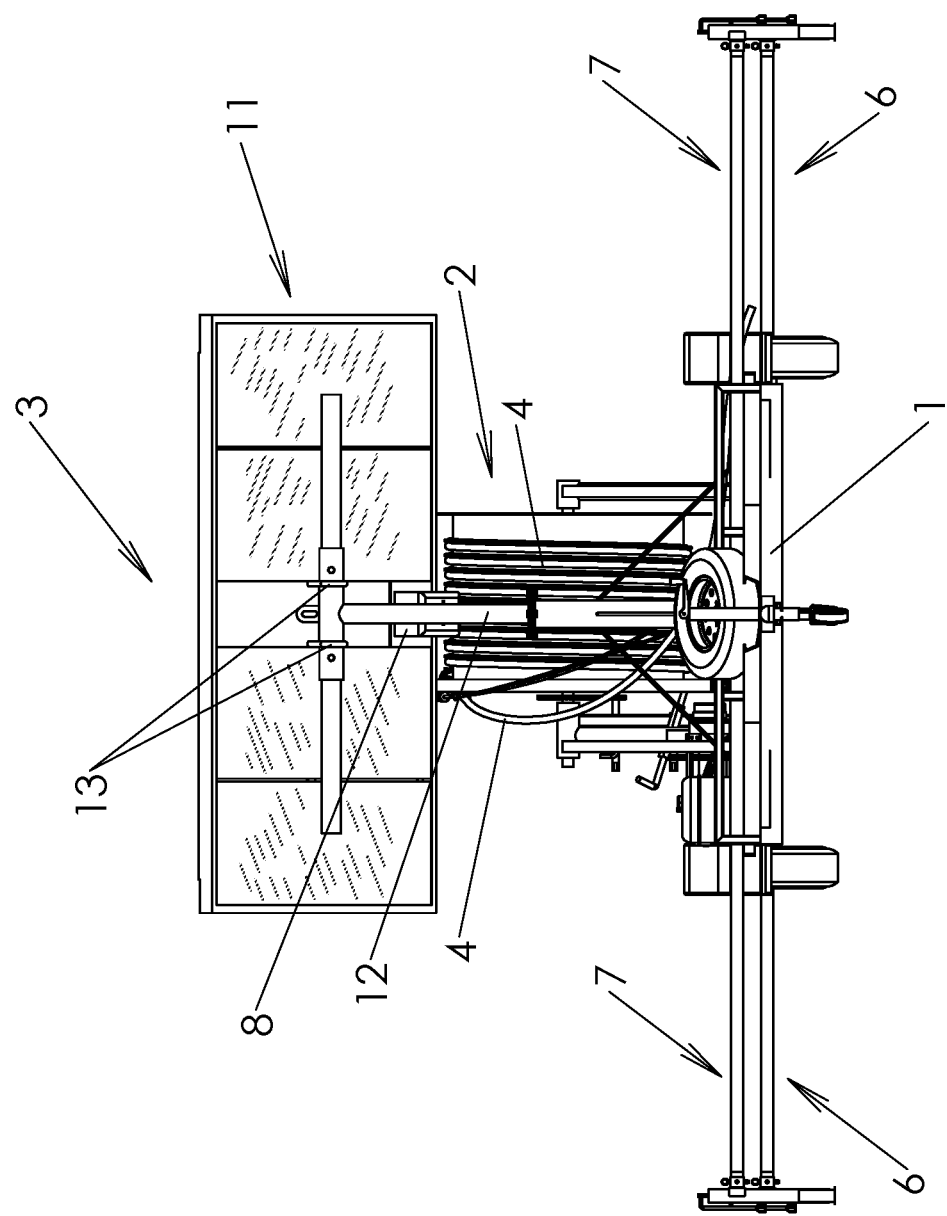
FIG. 5 is a rear view of the present invention.

FIG. 5 is a rear view of the present invention. As shown in this figure, the solar panels 3 are held within a frame 11, and that frame 11 is secured to a vertical post 12 by brackets 13 situated in the approximate center of the underside of the frame 11. These brackets 13 are configured to allow the frame 11 to be tilted vertically on the post 12. The post 12 itself is preferably configured so that it can be rotated horizontally in any direction (that is, clockwise or counterclockwise). In a preferred embodiment, the width of the solar panel array 3 is about the same as the width of the entire trailer bed 1.

Figure 6:
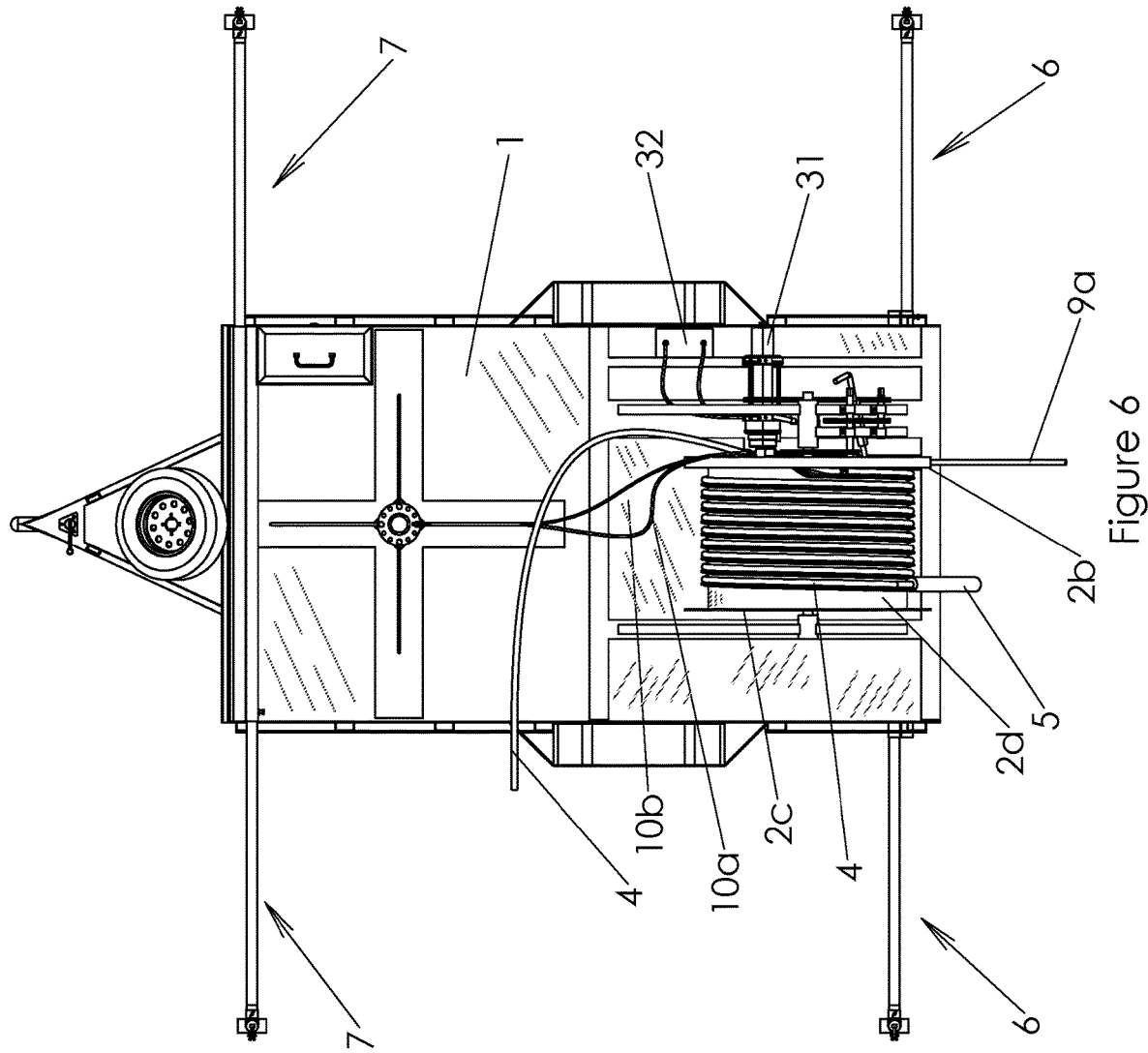
FIG. 6 is a top view of the present invention.

FIG. 6 is a top view of the present invention. In this figure, the solar panels 3 have been removed for clarity. As shown in this figure, the trailer bed 1 is divided approximately in half laterally; that half of the trailer that comprises the reel is referred to herein as the "front half," and that half of the trailer that comprises the vertical post 12 and solar panels 3 (not shown) is referred to herein as the "rear half." Note that the reel is situated toward the front end of the front half of the trailer bed, and the vertical post 12 is preferably situated in approximately the center of the rear half of the trailer bed. The reel comprise a right flange 2b, a left flange 2c, and a central drum 2d around which the pipe 3 is wound. The lip 2a extends circumferentially around the periphery of the right flange 2b. During transport, the outriggers 6, 7 are stored within the elongated housing 6b, 7b. The length of each outrigger 6, 7 is preferably about the same as the width of the trailer bed 1. When in an extended position, each outrigger is secured within the elongated tube by a set screw 33.

FIG. 7 is a detail view of the sprocket system of the present invention. The battery 32 supplies power to the motor 31, which drives the first sprocket 15. The first sprocket 15 is mechanically coupled to a first chain 16, which is also mechanically coupled to a second sprocket 17. The first chain 16 rotates with the first sprocket 15, and as the first chain 16 rotates, it causes the second sprocket 17 to rotate. The second sprocket 17 shares a common axle with a third sprocket 18; therefore, as the second sprocket 17 rotates, the third sprocket 18 also rotates. The third sprocket 18 and a fourth sprocket 19 are both mechanically coupled to a second chain 20, which causes the fourth sprocket 19 to rotate when the third sprocket 18 rotates. The fourth sprocket 19 shares a common axle with a fifth sprocket 21; therefore, as the fourth sprocket 19 rotates, the fifth sprocket 21 does as well. The fifth sprocket 21 and a sixth sprocket 22 are both mechanically coupled to a third chain 23, which causes the sixth sprocket 22 to rotate when the fifth sprocket 21 rotates. Within this sprocket system, the second, third and fifth sprockets 17, 18, 21 are all preferably the same size, and all three of these sprockets are smaller than the first, fourth and sixth sprockets 15, 19, 22. The fourth sprocket 19 is larger than the first sprocket 15, and the sixth sprocket 22 is larger than the fourth sprocket 19. The sixth sprocket 22 is mechanically coupled to the central axle of the reel so that the reel rotates when the sixth sprocket 22 rotates. The entire sprocket system is designed to function as a gear reduction system, thereby increasing torque. Two pairs of brackets 38 on the frame of the sprocket system allow the sprockets to be adjusted downward or upward to tighten or loosen the tension on the chains.

Figure 19:
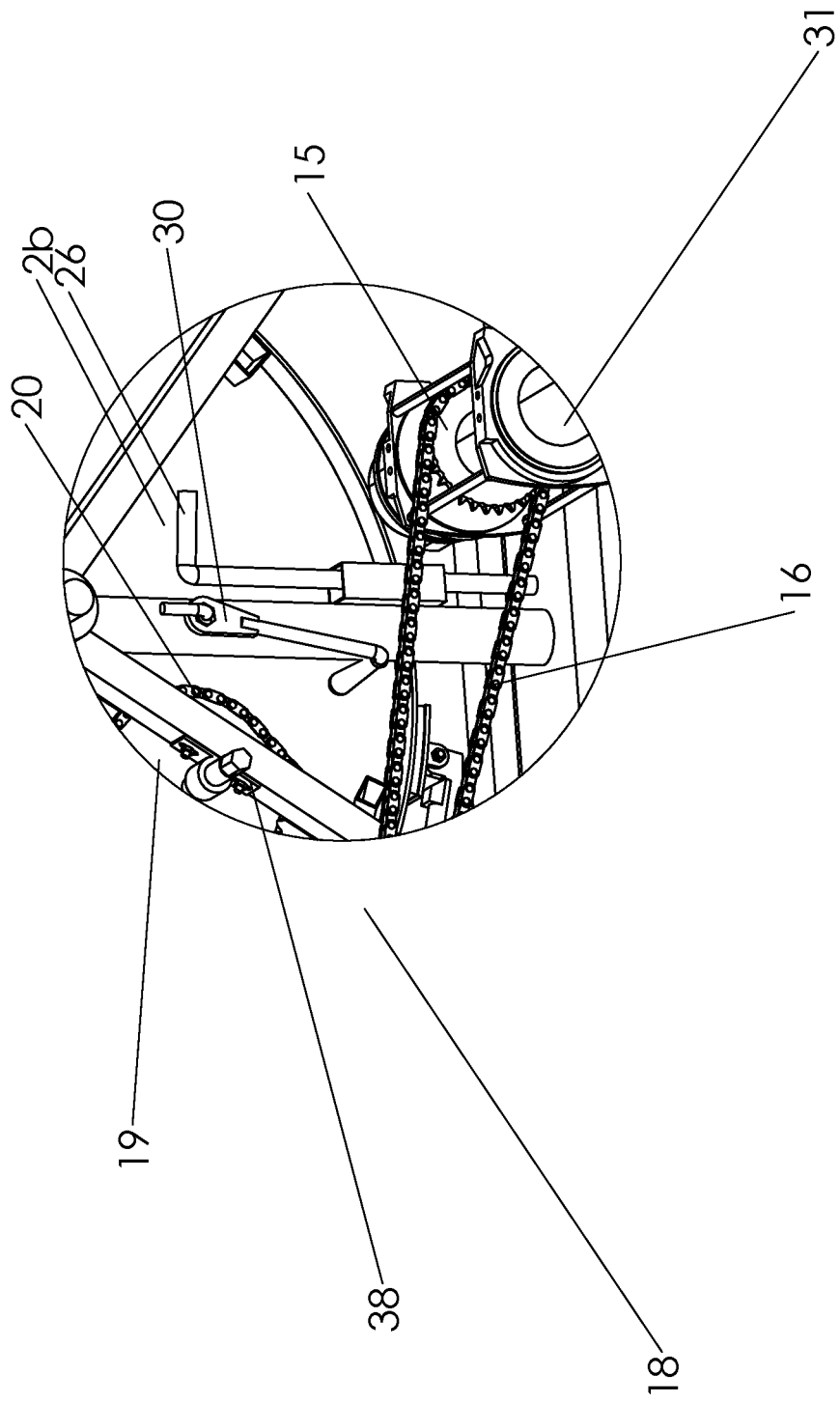
FIG. 19 is a detail view of the hand crank and key in a stored position.

In a preferred embodiment, the reel 2 comprises four evenly spaced recesses 24 situated circumferentially around the perimeter of the right flange 2b and facing outward (toward the sprocket system). A diagonal bracket 25 situated behind the second chain 20 and above the first chain 17 guides a key 26 (see FIG. 9) into any one of these recesses, thereby locking the reel 2 and preventing it from rotating further. This bracket 25 is preferably at an angle (as opposed to horizontal) so that gravity will keep the key 26 in place. Both the hand crank 30 and the key 26 are preferably stored in a hanging position on the sprocket system framework (see FIG. 19).

Figure 8:
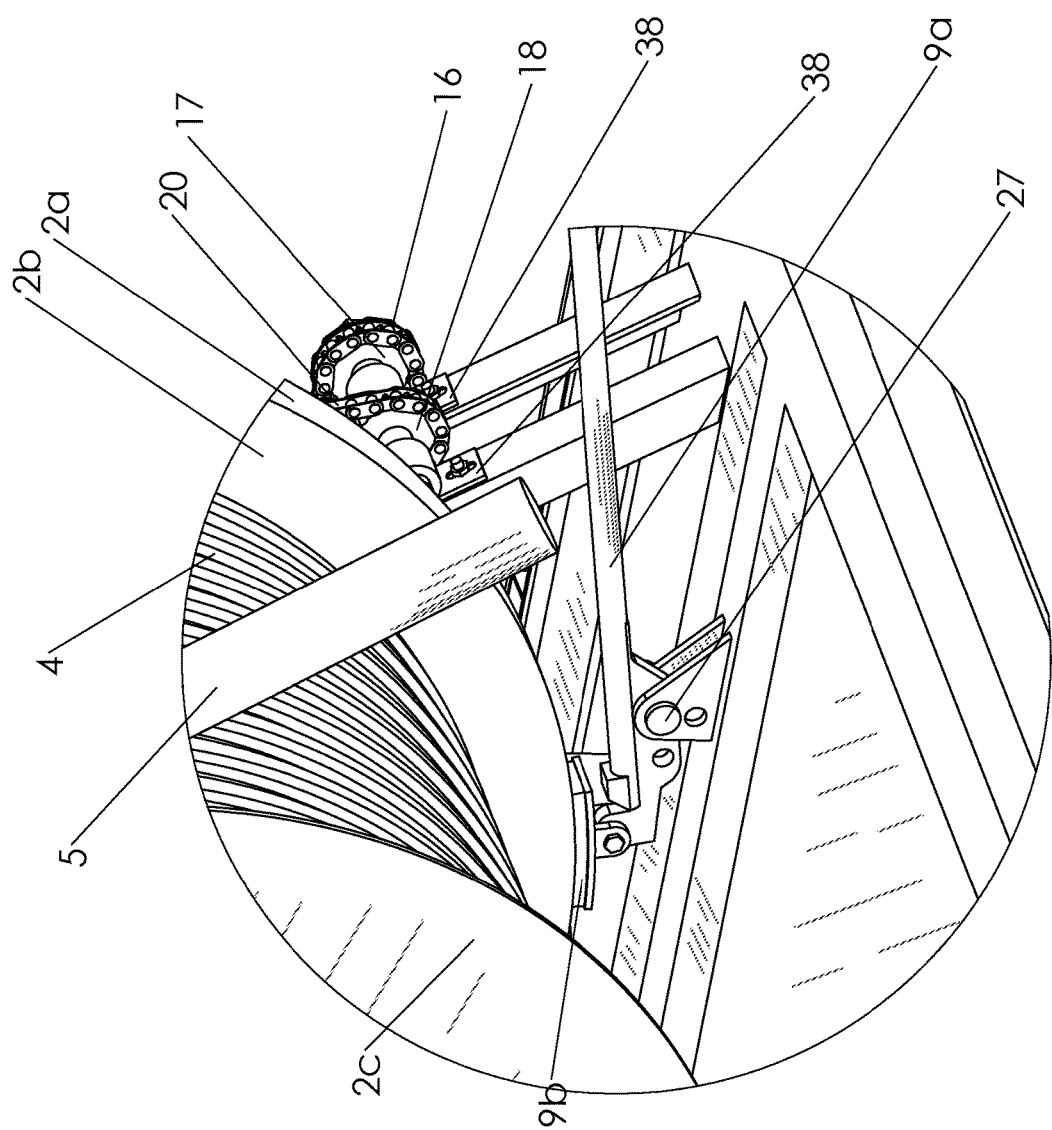
FIG. 8 is a detail view of the brake system of the present invention.

FIG. 8 is a detail view of the brake system of the present invention. The hand brake 9a is connected to a brake pad 9b, which is positioned to come into contact with the lip 2a on the right flange 2b of the reel 2 when downward pressure is placed on the hand brake 9a (via pivot point 27). The brake 9 allows the operator to regulate the speed with which the reel 2 rotates as the weight of the pipe 3 in the wellbore accelerates the rate of rotation of the reel 2.

Figure 9:
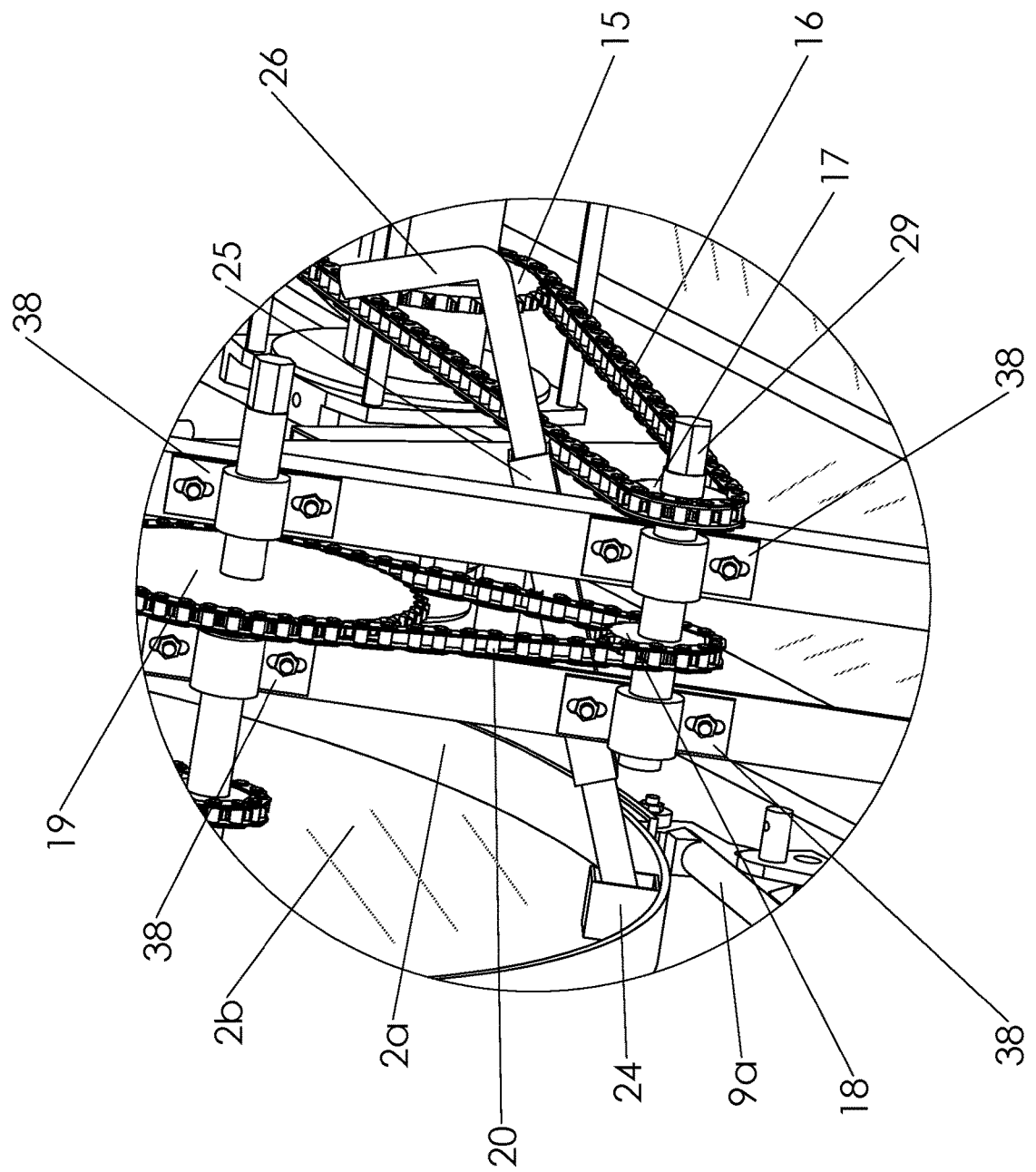
FIG. 9 is a detail view of the reel lock of the present invention.

FIG. 9 is a detail view of the reel lock of the present invention. This figure shows in greater detail the locking mechanism previously described. Note that the recess 24 is formed by welding a small box onto the outer surface of the right flange 2b just inside the lip 2a.

Figure 10:
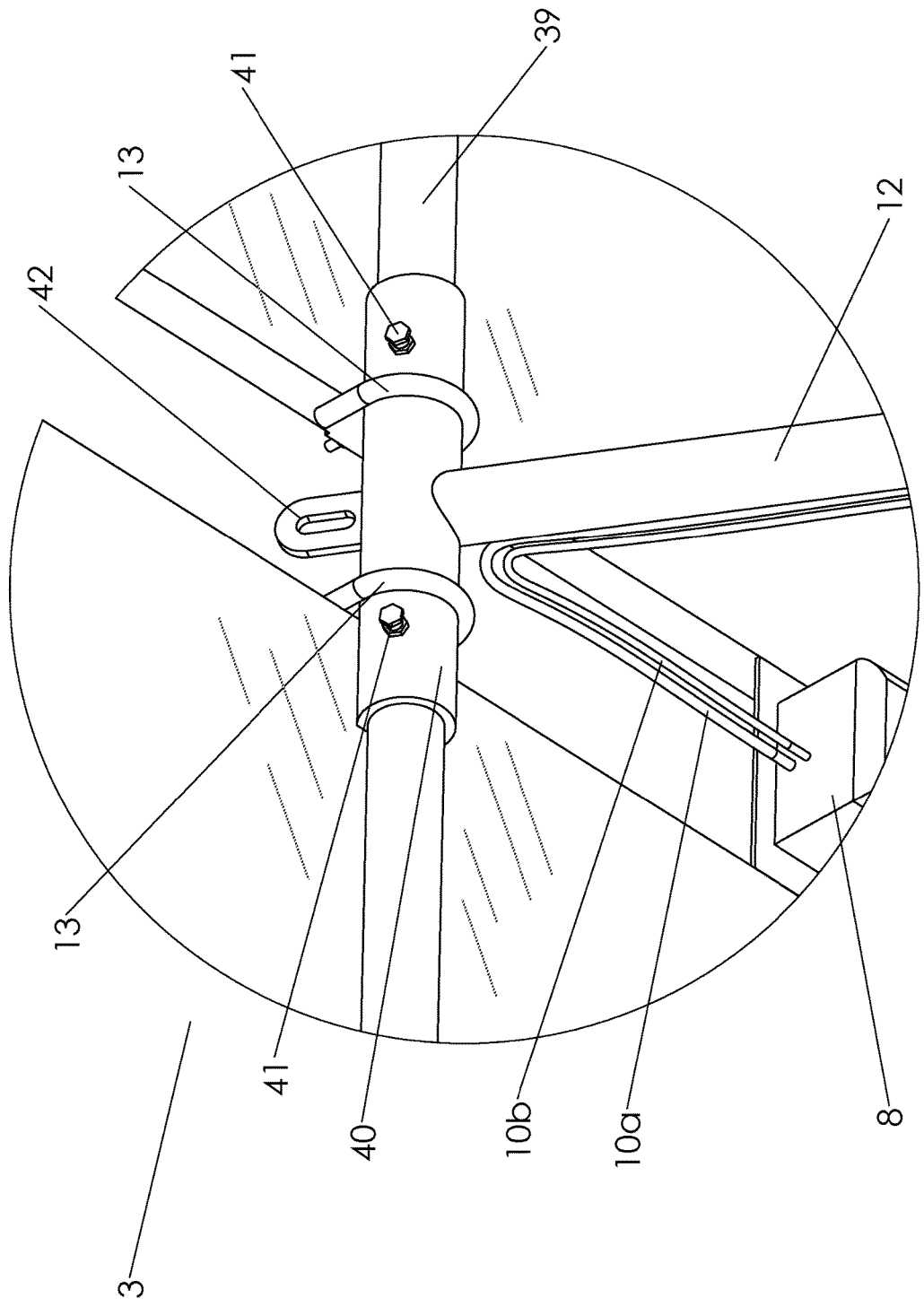
FIG. 10 is a detail view of the solar panel swivel point of the present invention.

FIG. 10 is a detail view of the solar panel swivel point of the present invention. This figure is a detail view of the previously described bracket 13, which allows the frame 11 of the solar panel array 3 to tilt vertically upward or downward. In a preferred embodiment, the framework supporting the solar panel array 3 constitutes a main horizontal member 39, which passes through a centrally located tube 40. The horizontal member 39 is set within the tube 40 with set screws or bolts 41. To adjust the tilt angle of the solar panel array 3, the set screws 41 are loosened, the panel is tilted, and the screws are again tightened. In the embodiment shown in the figures, a lifting eye 42 is situated in the center of the panel array 3; however, the present invention is not limited to this particular configuration. In alternate embodiments, there would be no opening in the center of the solar panel array 3, and lifting eyes would be located on the perimeter of the framework rather than in the center.

Figure 11:
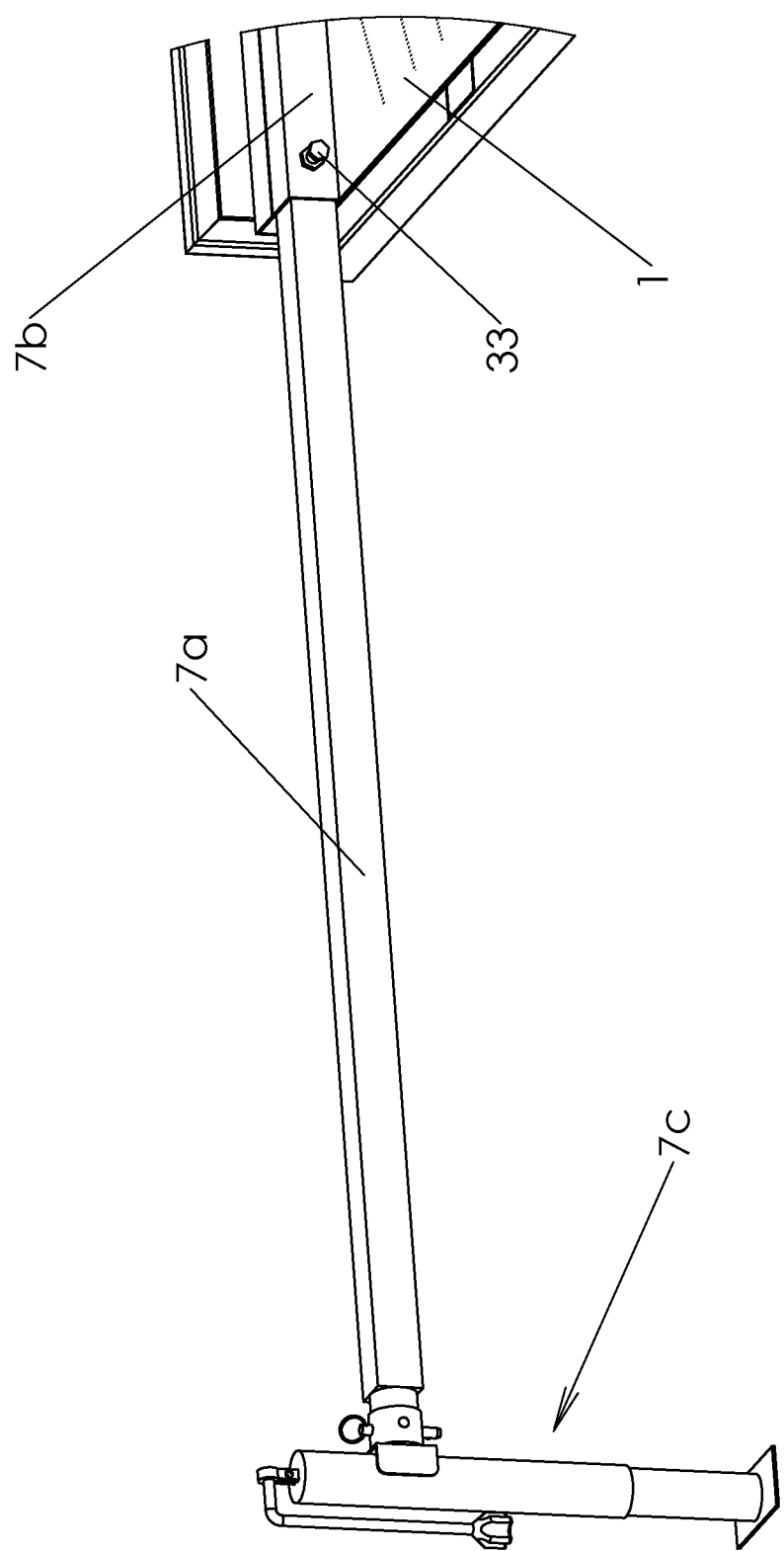
FIG. 11 is a detail view of the rear outrigger of the present invention.

FIG. 11 is a detail view of the rear outrigger of the present invention. As shown in this figure, the outrigger 7 comprises an elongated metal tube 7a that is square in cross-section. This metal tube fits inside of an elongated housing 7b that is secured to the top surface of the trailer bed 1 along the rear-most edge of the trailer bed. A jack 7c is connected to the distal end of the elongated tube 7a and used to adjust the height of the outrigger if needed. Although this figure shows only the rear outrigger 7, the front outrigger 6 is similar constructed, except that the elongated housing is secured to the underside of the trailer bed 1 along the front-most edge of the trailer bed. The reason the front outrigger is secured underneath the trailer bed is to accommodate the reel and sprocket system on top of the front end of the trailer bed.

Figure 12:
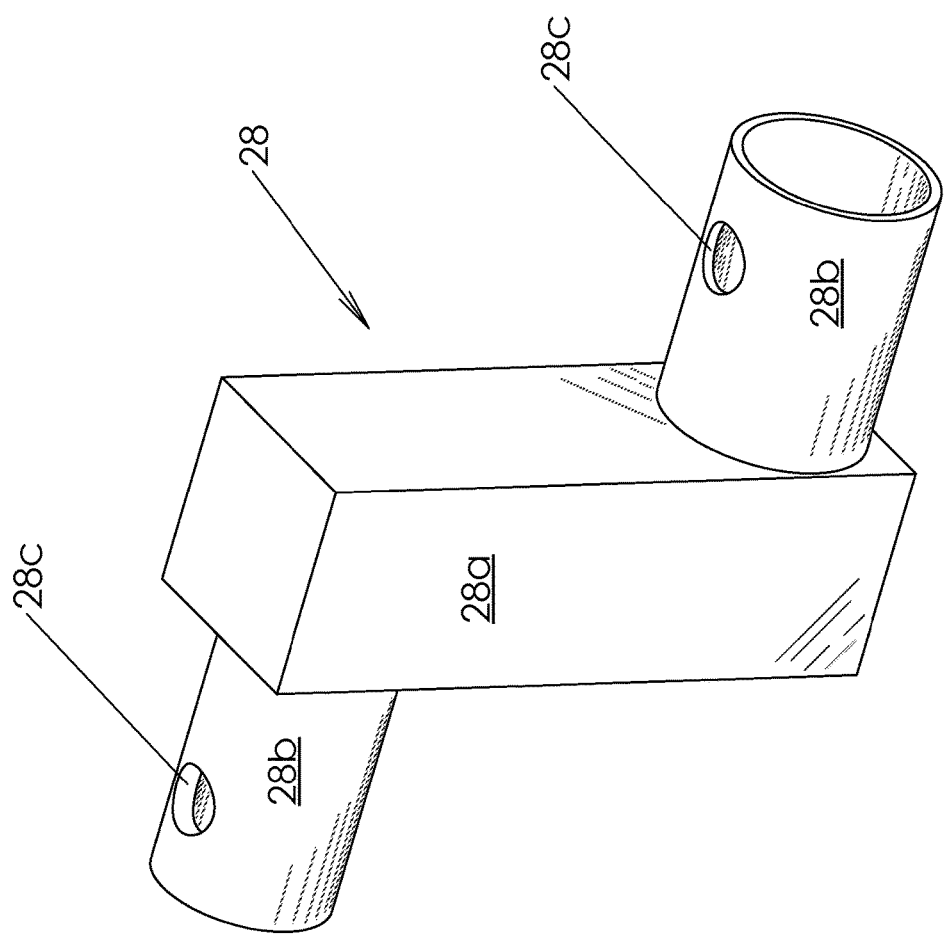
FIG. 12 is a detail view of the outrigger height adjustment member of the present invention.

FIG. 12 is a detail view of the outrigger height adjustment member of the present invention. As shown, the height adjustment member 28 is comprised of a central block 28a and two outward extensions 28b. The outward extensions 28b are comprised of round tubing and welded to the outer surface of the block 28a on opposite sides of the block and also on opposite ends of the block. Holes 28c in the extensions 28b allow the member 28 to be connected to the jack 7c and outrigger 6, 7. The height adjustment member is used to lower or raise the outrigger relative to the jack.

Figure 13:
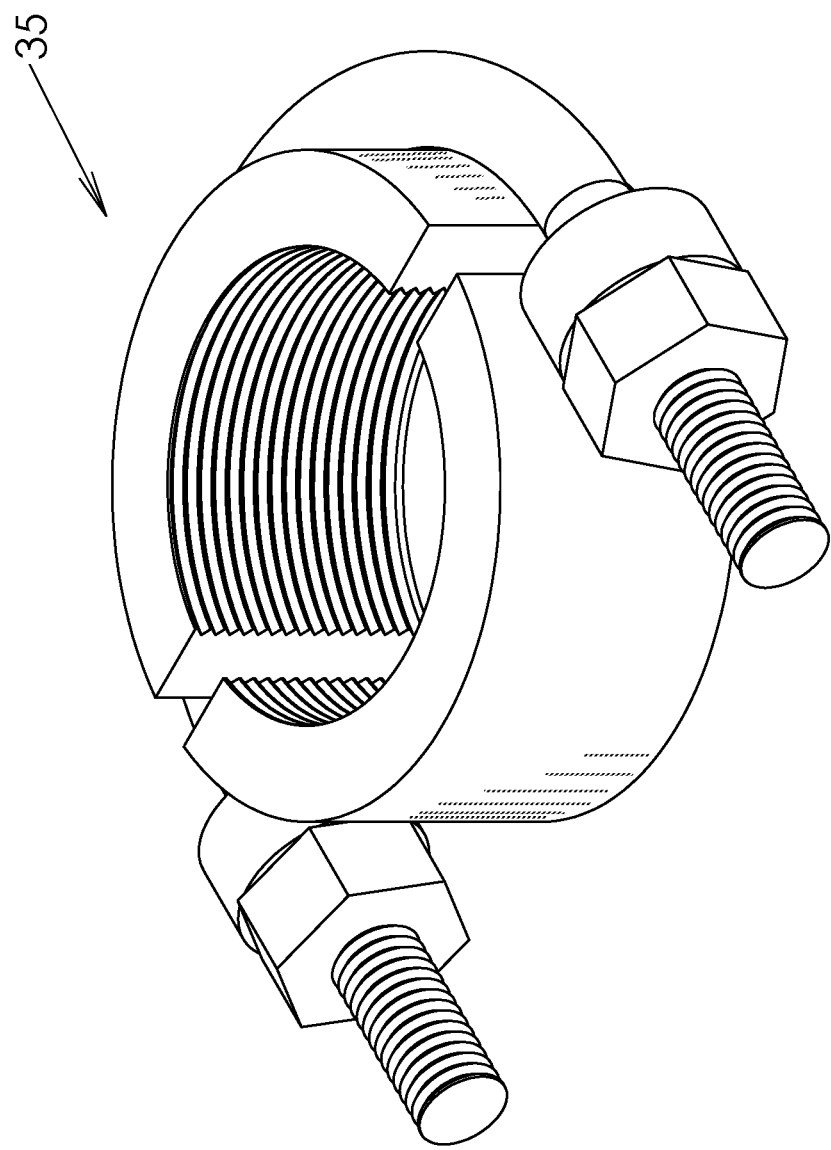
FIG. 13 is a detail view of a first embodiment of the pipe clamp of the present invention.
Figure 14:
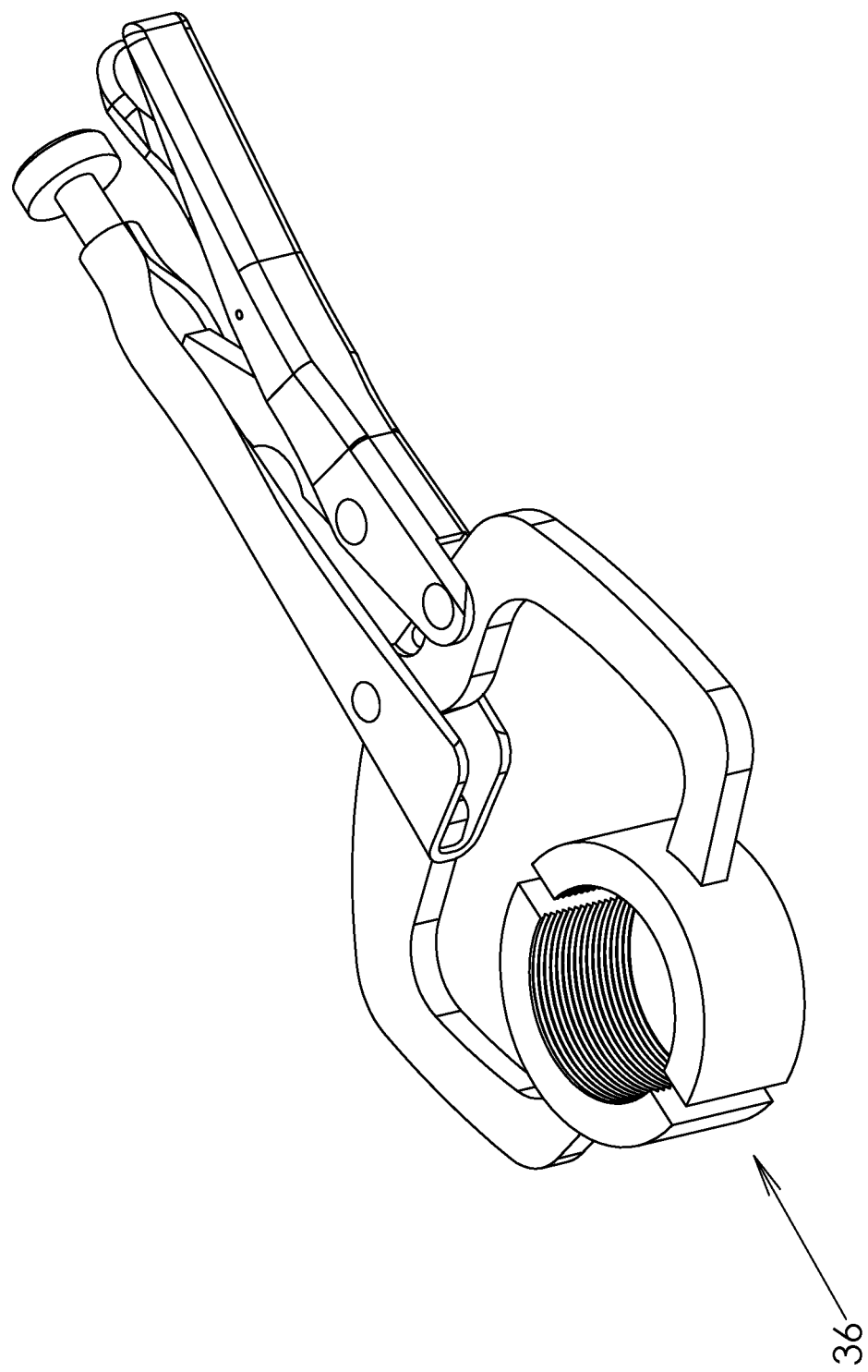
FIG. 14 is a detail view of a second embodiment of the pipe clamp of the present invention.
Figure 16:
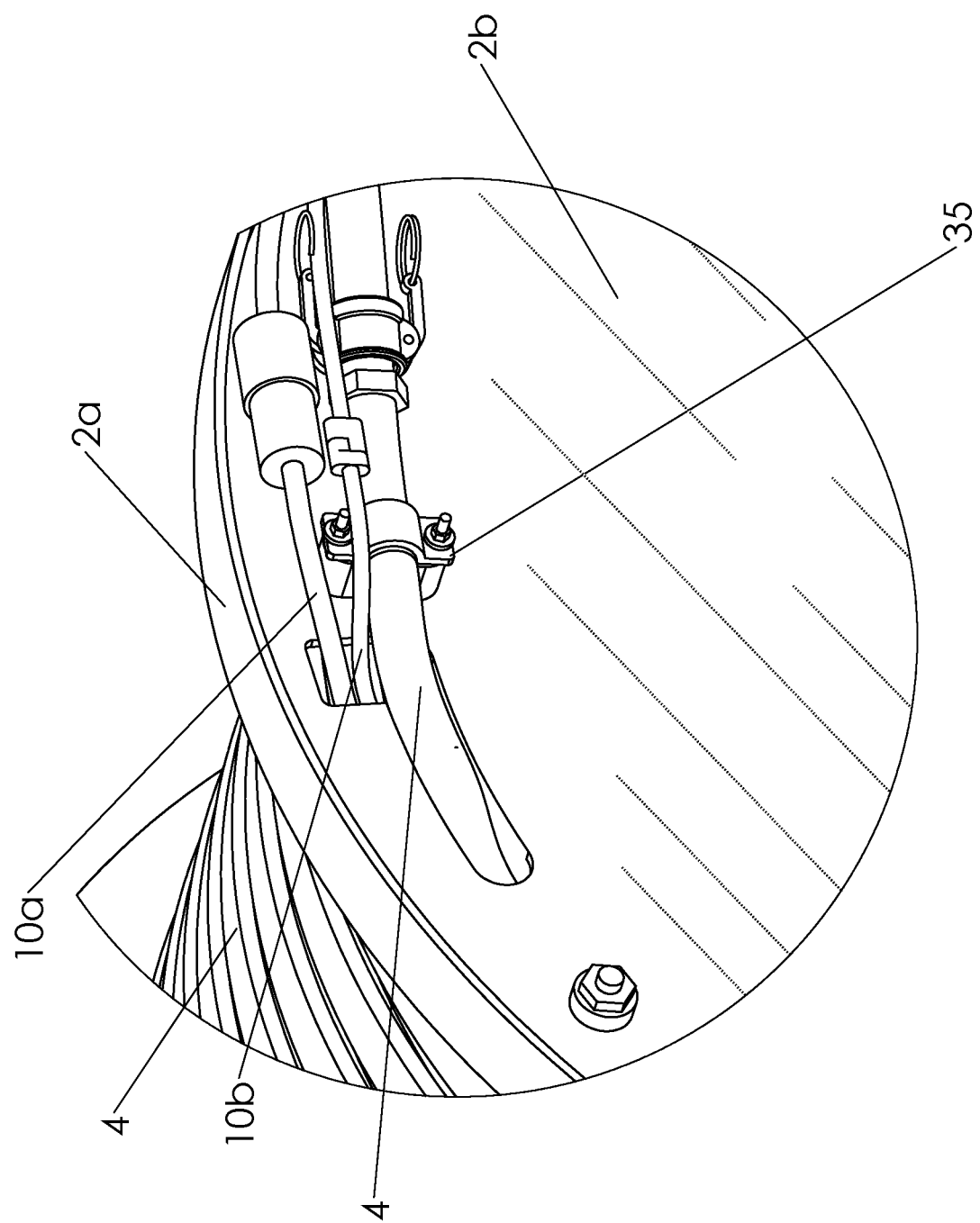
FIG. 16 is a detail view of the clamp that secures the pipe to the outer surface of the right flange.
Figure 17:
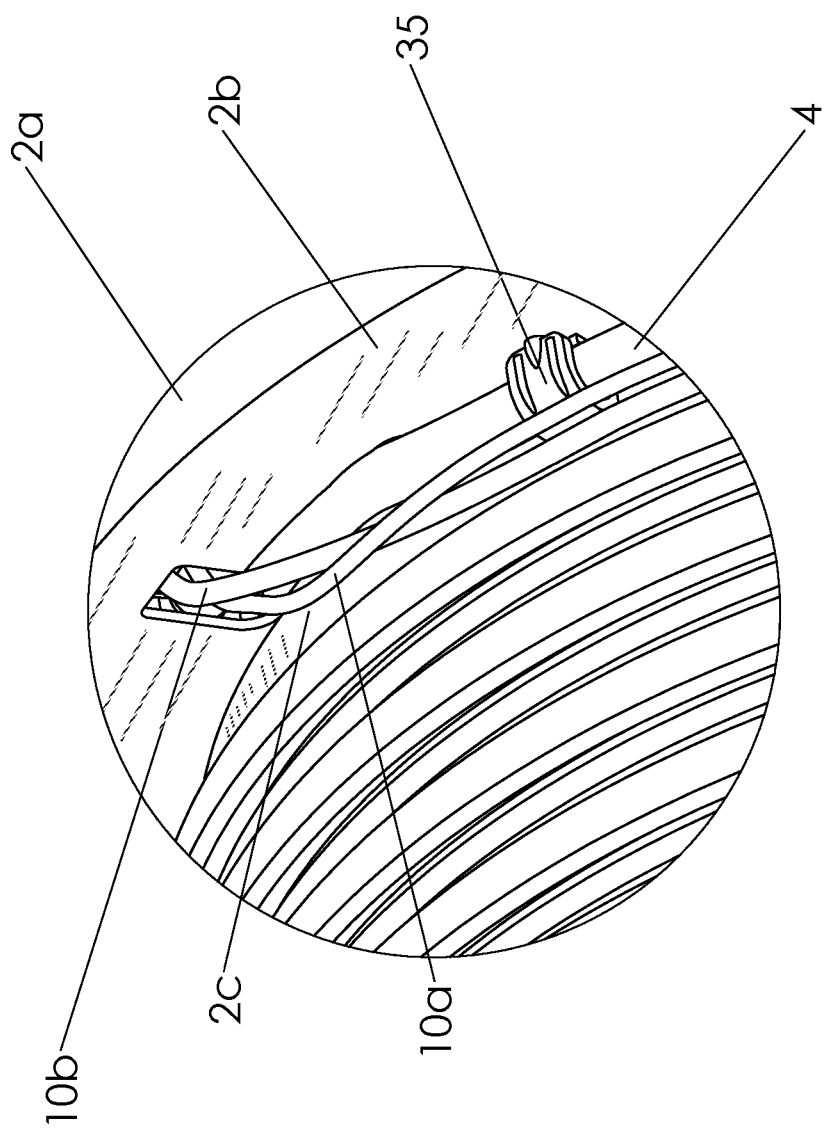
FIG. 17 is a detail view of the clamp that secures the pipe to the inner surface of the right flange.
Figure 20:
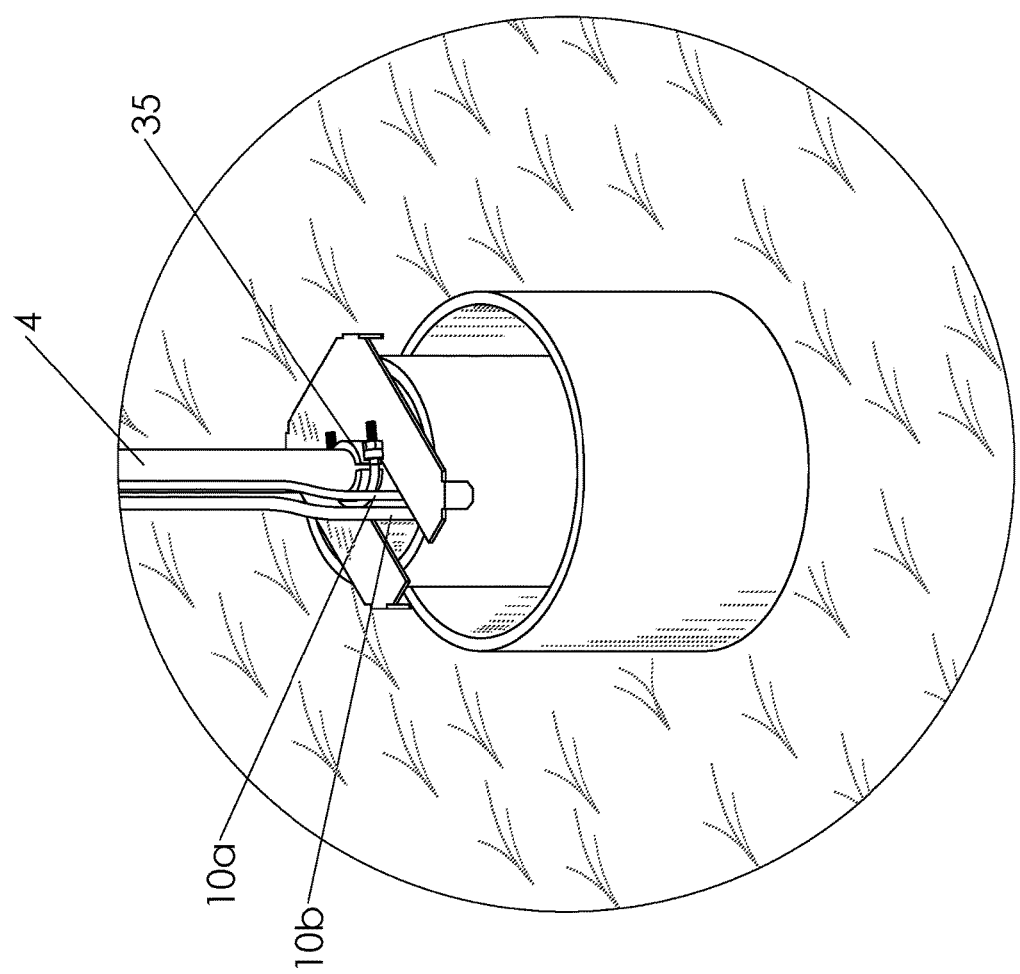
FIG. 20 is a detail view of the clamp on the pipe positioned on the cover plate on top of the wellbore.

FIG. 13 is a detail view of a first embodiment of the pipe clamp of the present invention, and FIG. 14 is a detail view of a second embodiment of the pipe clamp of the present invention. In a preferred embodiment, a clamp 35, 36 is secured to the pipe 5 and then set on top of a plate at the wellhead (see FIG. 20). In this manner, the weight of the pipe that is down the wellbore is held by the clamp against the plate and not by the reel alone (and the lock on the reel). The clamp also holds the pipe at the top of the wellbore so that in the ease of a wildfire, the pump would not be lost down the wellbore and could still be retrieved. Two different preferred embodiments of the pipe clamp 35, 36 are shown in these figures, but the present invention is not limited to any particular type of pipe clamp. Note that the clamp has a threaded interior surface, which helps the clamp grab onto the pipe. Referring to FIG. 13, the same type of clamp 35 is preferably used to secure the pipe 4 to the right flange 2a (see FIGS. 16 and 17).

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A portable pump system for use over a wellbore comprising:
   (a) a utility trailer having a trailer bed and two wheels;
   (b) a reel around which is wound a length of flexible pipe; and
   (c) an array of solar panels;
   (d) a submersible pump;
   (e) a pair of front outriggers extending laterally from opposite sides of a front end of the trailer bed; and
   (f) a pair of rear outriggers extending laterally from opposite sides of a rear end of the trailer bed;
   wherein the reel is situated at a rear end of the trailer bed;
   wherein the trailer bed has a front half and a rear half, and the array of solar panels is situated in the front half of the trailer bed;
   wherein the submersible pump is attached to a distal end of the flexible pipe;

wherein the array of solar panels is configured to supply power to the submersible pump;
wherein the reel is mechanically coupled to a sprocket system situated on top of the trailer bed and adjacent to the reel;
wherein the sprocket system comprises a first sprocket that is mechanically coupled to a first chain;
wherein the first chain is mechanically coupled to a second sprocket;
wherein the first chain is configured to cause the second sprocket to rotate as the first sprocket rotates;
wherein the second sprocket shares a common axle with a third sprocket so that as the second sprocket rotates, the third sprocket also rotates;
wherein the third sprocket and a fourth sprocket are both mechanically coupled to a second chain;
wherein the second chain is configured to cause the fourth sprocket to rotate as the third sprocket rotates;
wherein the fourth sprocket shares a common axle with a fifth sprocket so that as the fourth sprocket rotates, the fifth sprocket also rotates;
wherein the fifth sprocket and a sixth sprocket are both mechanically coupled to a third chain;
wherein the third chain is configured to cause the sixth sprocket to rotate as the fifth sprocket rotates;
wherein the sixth sprocket is mechanically coupled to a central axle of the reel so that the reel rotates when the sixth sprocket rotates;
wherein the second sprocket, the third sprocket, and the fifth sprocket are all the same size and are all smaller than the first sprocket, the fourth sprocket and the sixth sprocket;
wherein the fourth sprocket is larger than the first sprocket; and
wherein the sixth sprocket is larger than the fourth sprocket.

2. A portable pump system for use over a wellbore comprising:
(a) a utility trailer having a trailer bed and two wheels;
(b) a reel around which is wound a length of flexible pipe; and
(c) an array of solar panels;
(d) a submersible pump;
(e) a pair of front outriggers extending laterally from opposite sides of a front end of the trailer bed; and
(f) a pair of rear outriggers extending laterally from opposite sides of a rear end of the trailer bed;
wherein the reel is situated at a rear end of the trailer bed;
wherein the trailer bed has a front half and a rear half, and the array of solar panels is situated in the front half of the trailer bed;
wherein the submersible pump is attached to a distal end of the flexible pipe;
wherein the array of solar panels is configured to supply power to the submersible pump;
wherein the reel is mechanically coupled to a sprocket system situated on top of the trailer bed and adjacent to the reel;
wherein the sprocket system comprises a first sprocket that is mechanically coupled to a first chain;
wherein the first chain is mechanically coupled to a second sprocket;
wherein the first chain is configured to cause the second sprocket to rotate as the first sprocket rotates;
wherein the second sprocket shares a common axle with a third sprocket so that as the second sprocket rotates, the third sprocket also rotates;
wherein the third sprocket and a fourth sprocket are both mechanically coupled to a second chain;
wherein the second chain is configured to cause the fourth sprocket to rotate as the third sprocket rotates;
wherein the fourth sprocket shares a common axle with a fifth sprocket so that as the fourth sprocket rotates, the fifth sprocket also rotates;
wherein the fifth sprocket and a sixth sprocket are both mechanically coupled to a third chain;
wherein the third chain is configured to cause the sixth sprocket to rotate as the fifth sprocket rotates;
wherein the sixth sprocket is mechanically coupled to a central axle of the reel so that the reel rotates when the sixth sprocket rotates;
wherein the invention further comprises a hand crank and an electric motor;
wherein the hand crank is configured so as to be removably and mechanically coupled to both the second sprocket and the fourth sprocket; and
wherein the electric motor is configured to drive the first sprocket.

3. A portable pump system for use over a wellbore comprising:
(a) a utility trailer having a trailer bed and two wheels;
(b) a reel around which is wound a length of flexible pipe; and
(c) an array of solar panels;
(d) a submersible pump;
(e) a pair of front outriggers extending laterally from opposite sides of a front end of the trailer bed; and
(f) a pair of rear outriggers extending laterally from opposite sides of a rear end of the trailer bed;
wherein the reel is situated at a rear end of the trailer bed;
wherein the trailer bed has a front half and a rear half, and the array of solar panels is situated in the front half of the trailer bed;
wherein the submersible pump is attached to a distal end of the flexible pipe;
wherein the array of solar panels is configured to supply power to the submersible Pump;
wherein the reel is mechanically coupled to a sprocket system situated on top of the trailer bed and adjacent to the reel;
wherein the sprocket system comprises a first sprocket that is mechanically coupled to a first chain;
wherein the first chain is mechanically coupled to a second sprocket;
wherein the first chain is configured to cause the second sprocket to rotate as the first sprocket rotates;
wherein the second sprocket shares a common axle with a third sprocket so that as the second sprocket rotates, the third sprocket also rotates;
wherein the third sprocket and a fourth sprocket are both mechanically coupled to a second chain;
wherein the second chain is configured to cause the fourth sprocket to rotate as the third sprocket rotates;
wherein the fourth sprocket shares a common axle with a fifth sprocket so that as the fourth sprocket rotates, the fifth sprocket also rotates;
wherein the fifth sprocket and a sixth sprocket are both mechanically coupled to a third chain;
wherein the third chain is configured to cause the sixth sprocket to rotate as the fifth sprocket rotates;
wherein the sixth sprocket is mechanically coupled to a central axle of the reel so that the reel rotates when the sixth sprocket rotates;

wherein the front outriggers are mounted on the underside of the front end of the trailer bed;

wherein the rear outriggers are mounted on the topside of the rear end of the trailer bed; and wherein the front outriggers lie on a first horizontal plane, the rear outriggers lie on a second horizontal plane, and the first horizontal plane is lower than the second horizontal plane.

4. The portable pump system of claim 3, wherein the front outriggers are configured to be removably stored within a first elongated housing located on the underside of the front end of the trailer bed; and wherein the rear outriggers are configured to be removably stored within a second elongated housing located on the topside of the rear end of the trailer bed.

5. A portable pump system for use over a wellbore comprising:

(a) a utility trailer having a trailer bed and two wheels;
(b) a reel around which is wound a length of flexible pipe; and
(c) an array of solar panels;
(d) a submersible pump;
(e) a pair of front outriggers extending laterally from opposite sides of a front end of the trailer bed; and
(f) a pair of rear outriggers extending laterally from opposite sides of a rear end of the trailer bed;

wherein the reel is situated at a rear end of the trailer bed;

wherein the trailer bed has a front half and a rear half, and the array of solar panels is situated in the front half of the trailer bed;

wherein the submersible pump is attached to a distal end of the flexible pipe;

wherein the array of solar panels is configured to supply power to the submersible pump;

wherein the reel is mechanically coupled to a sprocket system situated on top of the trailer bed and adjacent to the reel;

wherein the sprocket system comprises a first sprocket that is mechanically coupled to a first chain;

wherein the first chain is mechanically coupled to a second sprocket;

wherein the first chain is configured to cause the second sprocket to rotate as the first sprocket rotates;

wherein the second sprocket shares a common axle with a third sprocket so that as the second sprocket rotates, the third sprocket also rotates;

wherein the third sprocket and a fourth sprocket are both mechanically coupled to a second chain;

wherein the second chain is configured to cause the fourth sprocket to rotate as the third sprocket rotates;

wherein the fourth sprocket shares a common axle with a fifth sprocket so that as the fourth sprocket rotates, the fifth sprocket also rotates;

wherein the fifth sprocket and a sixth sprocket are both mechanically coupled to a third chain;

wherein the third chain is configured to cause the sixth sprocket to rotate as the fifth sprocket rotates;

wherein the sixth sprocket is mechanically coupled to a central axle of the reel so that the reel rotates when the sixth sprocket rotates;

wherein the reel comprises a right flange, a left flange, and a central drum around which the pipe is wound;

wherein the reel further comprises a lip that extends circumferentially around a periphery of the right flange;

wherein the invention further comprises a diagonal bracket situated behind the second chain and above the first chain, the diagonal bracket being configured to accept a key; and wherein the lip comprises a plurality of recesses configured to receive the key when it is inserted into the diagonal bracket.

6. A portable pump system for use over a wellbore comprising:

(a) a utility trailer having a trailer bed and two wheels;
(b) a reel around which is wound a length of flexible pipe; and
(c) an array of solar panels;
(d) a submersible pump;
(e) a pair of front outriggers extending laterally from opposite sides of a front end of the trailer bed; and
(f) a pair of rear outriggers extending laterally from opposite sides of a rear end of the trailer bed;

wherein the reel is situated at a rear end of the trailer bed;

wherein the trailer bed has a front half and a rear half, and the array of solar panels is situated in the front half of the trailer bed;

wherein the submersible pump is attached to a distal end of the flexible pipe;

wherein the array of solar panels is configured to supply power to the submersible pump;

wherein the reel is mechanically coupled to a sprocket system situated on top of the trailer bed and adjacent to the reel;

wherein the reel comprises a right flange, a left flange, and a central drum around which the pipe is wound;

wherein the reel further comprises a lip that extends circumferentially around a periphery of the right flange;

wherein the invention further comprises a hand brake and a brake pad; and wherein the brake pad is positioned to contact the lip on the right flange of the reel when downward pressure is placed on the hand brake via a pivot point situated on top of the trailer bed and underneath the reel.

* * * * *